United States Patent
Feix et al.

(10) Patent No.: US 9,596,080 B2
(45) Date of Patent: *Mar. 14, 2017

(54) METHOD OF GENERATING PRIME NUMBERS PROVEN SUITABLE FOR CHIP CARDS

(71) Applicant: INSIDE SECURE, Meyreuil (FR)

(72) Inventors: Benoît Feix, Aubagne (FR); Christophe Clavier, Rilhac Lastours (FR); Pascal Paillier, Paris (FR); Loïc Thierry, Saint-Yrieix-la-Perche (FR)

(73) Assignee: Inside Secure, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/365,899

(22) PCT Filed: Dec. 12, 2012

(86) PCT No.: PCT/FR2012/052902
§ 371 (c)(1),
(2) Date: Jun. 16, 2014

(87) PCT Pub. No.: WO2013/088066
PCT Pub. Date: Jun. 20, 2013

(65) Prior Publication Data
US 2014/0355758 A1  Dec. 4, 2014

(30) Foreign Application Priority Data

Dec. 15, 2011 (FR) .................................. 11 61739
Dec. 15, 2011 (FR) .................................. 11 61740
(Continued)

(51) Int. Cl.
*H04L 9/08* (2006.01)
*G06F 7/58* (2006.01)
(Continued)

(52) U.S. Cl.
CPC .............. *H04L 9/0869* (2013.01); *G06F 7/58* (2013.01); *G06F 7/72* (2013.01); *G06F 17/11* (2013.01);
(Continued)

(58) Field of Classification Search
CPC . H04L 9/0869; H04L 2209/24; H04L 9/0816; H04L 9/0662; H04L 9/0894
See application file for complete search history.

(56) References Cited

U.S. PATENT DOCUMENTS 6,731,755 B1 * 5/2004 Cocks ..................... H04L 9/302
380/277
6,952,476 B1 * 10/2005 Mao ...................... H04L 9/3093
380/277
(Continued)

OTHER PUBLICATIONS

Shawe-Tayler J: "Generating strong primes", Electronics Letter UK, vol. 16, Jul. 31, 1986 (Jul. 31, 1986), pp. 875-877.*
(Continued)

*Primary Examiner* — Yonas Bayou
(74) *Attorney, Agent, or Firm* — Brake Hughes Bellermann LLP

(57) ABSTRACT

This disclosure relates to methods for generating a prime number, which can be implemented in an electronic device. An example method can include calculating a candidate prime number using a formula Pr=2P·R+1, where P is a prime number and R is an integer. The method can also include applying the Pocklington primality test to the candidate prime number and rejecting the candidate prime number if it fails the Pocklington test. The integer can be generated from an invertible number belonging to a set of invertible elements modulo the product of numbers belonging to a group of small prime numbers greater than 2, where the candidate prime number is not divisible by any number of the group. The prime number P having a number of bits
(Continued)

Figure 1:
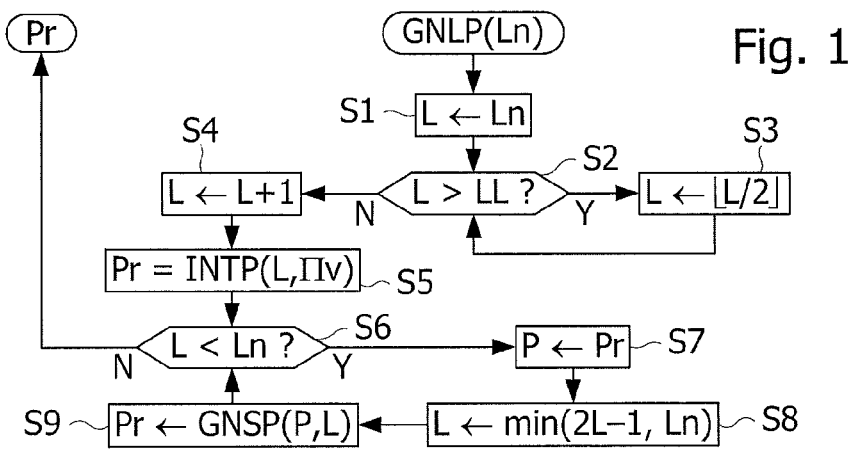

equal to within one bit, to half or a third of the number of bits of the candidate prime number.

35 Claims, 8 Drawing Sheets

(30)  Foreign Application Priority Data

Dec. 15, 2011 (FR) ...................................... 11 61741
Dec. 15, 2011 (FR) ...................................... 11 61742
May 30, 2012 (FR) ...................................... 12 01550

(51) Int. Cl.
*G06F 7/72* (2006.01)
*G06F 17/11* (2006.01)

(52) U.S. Cl.
CPC .... *H04L 9/0816* (2013.01); *G06F 2207/7204* (2013.01); *H04L 2209/24* (2013.01)

(56) References Cited

U.S. PATENT DOCUMENTS

| | | | | |
|---|---|---|---|---|
| 7,020,283 B1* | 3/2006 | Wada | ...................... | G06F 7/588 380/46 |
| 7,519,178 B1* | 4/2009 | Matyas, Jr. | ................ | G06F 7/72 380/255 |
| 8,233,620 B2* | 7/2012 | Dupaquis | .............. | H04L 9/0631 380/277 |
| 8,619,977 B2* | 12/2013 | Douguet | ................. | G06F 7/725 380/28 |
| 2003/0108193 A1* | 6/2003 | Sotoodeh | .............. | H04L 9/3033 380/28 |
| 2007/0121934 A1* | 5/2007 | Futa | ......................... | G06F 7/72 380/28 |
| 2009/0245507 A1* | 10/2009 | Vuillaume | ................. | G06F 7/72 380/28 |
| 2010/0027788 A1* | 2/2010 | Tkacik | .................... | H04L 63/06 380/46 |
| 2010/0329455 A1* | 12/2010 | Nemiroff | .............. | H04L 9/0662 380/46 |

OTHER PUBLICATIONS

Shawe-Tayler J: "Generating strong primes", Electronics Letter UK, vol. 16, Jul. 31, 1986 (Jul. 31, 1986), pp. 875-887.*

Joye M. et al.: "Efficient generation of prime numbers", Cryptographic Hardware and Embedded Systems, Ches 2000, Worchester, MA, Aug. 17-18, 2000 Proceedings, pp. 340-354.*

* cited by examiner

METHOD OF GENERATING PRIME NUMBERS PROVEN SUITABLE FOR CHIP CARDS

The present invention relates to encryption and in particular the generation of prime numbers. It also relates to integrated circuits such as those implemented in smart cards, and the generation of prime numbers in such integrated circuits.

Since the Diffie and Hellman invention in 1976, public key encryption has significantly developed. Today, it is used in various applications, such as payment, e-commerce, and identification applications as well as to cipher and sign data, and in numerous devices such as smart cards, USB drives and numerous microprocessors and computers. Most encryption systems like RSA (Rivest, Shamir, Adleman), DSA (Digital Signature Algorithm) and DH (Diffie Hellman key exchange) are based on the use of large prime numbers to generate encryption keys, or more generally secret data susceptible of being used in transactions requiring a certain level of security. The security of these encryption systems is therefore directly linked to the size of the prime numbers used.

Due to the continuous evolution of technology and in particular the computing power of computers, encryption systems use increasingly large encryption keys and therefore increasingly large prime numbers. Thus, some banking organizations now recommend using 1,024-bit, or even 2,048-bit prime numbers in certain applications.

Usually, generating a prime number involves randomly choosing a number and checking whether it is prime, for example by applying a primality test such as the sieve of Eratosthenes or the Miller-Rabin test. If the chosen number does not pass the primality test, a new number is then chosen. The choice of a new number varies from one method to another. It transpires that generating a prime number constitutes the most complex computation task to implement in encryption systems currently used today.

Ten years ago, it was inconceivable to perform this task of prime number generation in a smart card microcircuit due to the low computation power and storage abilities thereof. This task was therefore performed by a powerful computer, and the secret datum generated from the prime number was securely transmitted to the microcircuit during a factory initialization step of the circuit.

Current smart card microcircuits are generally equipped with encryption coprocessors to accelerate certain operations like multiplications of large numbers and modular exponentiation operations, and have an increasingly large storage capacity. These improvements make it possible to consider generating large prime numbers directly in the smart card. This approach offers more security since there is no risk of the computer generating the secret datum, or the transmission of the datum to the smart card, being hacked. In addition, thanks to this approach, the entity issuing the smart card cannot know the secret datum if it is generated in the card. This approach also enables the microcircuit to regenerate a prime number, as well as secret data based on this prime number, when necessary.

However, the computation and storage abilities of smart card microcircuits remain reduced compared with those of a desktop computer. In addition, in operational mode, the generation time of a key must remain below a limit acceptable for the user. There is therefore a need for a method of generating large prime numbers requiring small computation and storage means, complying with those implemented in smart cards.

Conventional methods of generating prime numbers are based on the use of probabilistic primality tests such as the Miller-Rabin and Lucas tests. However a probabilistic test does not by definition offer any absolute certainty that a generated number is prime and therefore does not enable proven prime numbers to be obtained. Yet, such certainty would offer a higher level of security, which is generally sought in encryption systems.

The trust level of such a test can be increased by executing several iterations of the test. Thus, generating a 1,024-bit prime number with a sufficient trust level requires 40 iterations of the Miller-Rabin test. This number of iterations may be reduced to 3 when the Miller-Rabin test is followed by the Lucas test. However, the Lucas test proves to be little compatible with the abilities of smart cards.

In addition, despite the significant improvements made to microcircuits integrated into smart cards, developing software adapted to such a microcircuit remains sensitive. Smart card microcircuits constitute an environment with multiple constraints compared with desktop computers or microprocessors implemented in multimedia devices. Indeed, the capacity of the memories present in these microcircuits remains reduced. Some encryption operations implemented by encryption algorithms such as DES (Digital Encryption System), AES (Advanced Encryption System), RSA and ECC (Elliptic Curve Cryptography) need to be moved to a coprocessor to be performed efficiently enough. Thus, modular exponentiation operations constitute the most expensive operations in encryption systems such as RSA and DSA embedded in a smart card microcircuit. Such exponentiation operations may also be required to generate prime numbers.

It is also necessary that the microcircuit remains protected against attacks aiming to discover the secret data stored or handled by the microcircuit. These last years, a great number of types of attacks have appeared, so developing a microcircuit protected against all the known types of attacks is a challenge.

It may therefore be desirable to generate prime numbers by a secure method which avoids involving probabilistic primality tests, and which may be embedded into a smart card microcircuit.

For this purpose, there are iterative methods of generating large proven prime numbers from a relatively small proven prime number which may be lower than 32 bits. Thus, publications [3] and [4] describe such methods.

It may be desirable to reduce the execution time of such methods.

Some embodiments relate to an encryption method implemented in an electronic device, the method comprising steps of: generating a prime number, generating an integer, generating a candidate prime number having a desired number of bits, using the following formula:

$$Pr = 2P \cdot R + 1,$$

Pr being the candidate prime number, P being the prime number and R being the integer, and
P being the prime number and having a number of bits lower than the number of bits of the candidate prime number and R being the integer, and supplying the candidate prime number as proven prime number if it passes the Pocklington primality test. According to one embodiment, the method to comprises steps of storing a group of small prime numbers greater than 2, calculating and storing a product of the prime numbers of the stored group, and generating an invertible number belonging to a set of invertible elements modulo the stored product, the integer being generated from the invertible number so that the candidate prime number is not divisible by any number of is the stored group, the prime number having a number of bits equal, to within one bit, to half or a third of the number of bits of the candidate prime number.

According to one embodiment, the integer is chosen equal to:

$$R=(X-(2P)^{-1} \bmod \Pi v)+Z\cdot \Pi v$$

R being the integer, X being an invertible number modulo the stored product, P being the prime number, and Z being an integer chosen so that the number R has a size such that the candidate prime number Pr has the desired number of bits.

According to one embodiment, the method comprises steps of generating a new candidate prime number from the invertible number multiplied by 2 modulo the stored product, if the candidate prime number does not pass the Pocklington primality test, and applying the Pocklington primality test to the new candidate prime number.

According to one embodiment, the invertible number is generated so as to be lower than the stored product, using the following equation:

$$X^{\lambda\cdot\Pi v}=1 \bmod \Pi v$$

X being the generated invertible number, $\Pi v$ being the stored product, $\lambda\Pi v$ being the Carmichael number of the set of invertible elements modulo the stored product.

According to one embodiment, the invertible number is generated by randomly choosing an invertible candidate number lower than the stored product, and by incrementing it by one until it verifies the equation $X^{\lambda\cdot\Pi v}=1 \bmod \Pi v$, in which X is the invertible candidate number, $\Pi v$ is the stored product, $\lambda\Pi v$ is the Carmichael number of the set of invertible elements modulo the stored product.

According to one embodiment, an invertible candidate number X is randomly chosen at a value lower than the stored product, and incremented by the quantity: $B\cdot(1-X^{\lambda\cdot\Pi v} \bmod \Pi v)$, in which B is an integer randomly chosen between one and the stored product, X is the invertible candidate number, $\Pi v$ is the stored product, $\lambda\Pi v$ is the Carmichael number of the set of invertible elements modulo the stored product $\Pi v$, until it verifies the equation, the number B being randomly chosen at a value lower than the stored product.

According to one embodiment, the size in number of bits of the candidate prime number is equal to three times the size of the prime number, to within one unit, the generated candidate prime number being retained as candidate prime number only if the quotient of the integer division of the integer by the prime number generated in the previous generation step is odd.

According to one embodiment, the integer is chosen in the interval [I+1,2I] with:

$$I = \left\lfloor \frac{2^{L-1}}{2P} \right\rfloor$$

L being the number of bits of the new prime number to be generated.

According to one embodiment, the method comprises several steps of generating a new prime number, a first generation step supplying a prime number from a first prime number, each subsequent generation step supplying a prime number from the prime number obtained in the previous generation step, until a prime number formed of a desired number of bits is obtained, each generation step comprising the steps of generating a candidate prime number and of the Pocklington test.

According to one embodiment, the first steps of generating a new prime number comprise: a—calculating a candidate prime number having a number of bits, using the following formula:

$$Pr=2P\cdot R+1$$

P being a proven prime number having a number of bits equal, to within one bit, to half or a third of the number of bits of the candidate prime number, and R being a randomly chosen integer, b—testing the divisibility of the candidate prime number by small prime numbers, c—if the candidate prime number is not divisible by the small prime numbers, applying the Pocklington primality test to the candidate prime number Pr, d—if one of the divisibility and Pocklington tests fails for the candidate prime number, incrementing the integer by one, incrementing the candidate prime number by twice the prime number, and executing steps b to d again as long as the incremented candidate prime number fails the divisibility and Pocklington tests.

According to one embodiment, testing the divisibility of the candidate prime number by small prime numbers comprises steps of: storing as first remainders, the remainders of the integer divisions of the candidate prime number by each of the small prime numbers, the candidate prime number being divisible by one of the small prime numbers if the corresponding remainder is equal to zero, storing as second remainders, the remainders of the integer divisions of twice the prime number by each of the small prime numbers, and if a new candidate prime number is calculated from the candidate prime number by adding twice the prime number thereto, updating each of the first remainders by adding thereto the second remainder corresponding to the same small prime number modulo the same small prime number.

According to one embodiment, each of the second remainders is updated by receiving the double of the first remainder corresponding to the same small prime number, modulo the same prime number of the stored group, when a new candidate prime number is generated from the prime number obtained in the previous generation step.

According to one embodiment, the first prime number is obtained by randomly choosing a number formed of the reduced number of bits and by successively applying thereto a limited number of primality tests comprising several Miller-Rabin tests applied in different bases, until a number passing the Miller-Rabin tests is obtained, the maximum number of bits and the values of the bases being chosen to prove the primality of the first prime number.

According to one embodiment, the Miller-Rabin tests applied to the randomly chosen number, are performed in bases 2, 7 and 61 with a maximum number of bits chosen lower than or equal to 32, or in bases 2, 3, 5, 7, 11, 13 and 17, with a maximum number of bits chosen lower than or equal to 48.

According to one embodiment, the Miller-Rabin tests applied to the randomly chosen number are preceded by a divisibility test of the randomly chosen number by numbers of a list of the smallest prime numbers.

Some embodiments also relate to an encryption method implemented in an electronic device and comprising steps of: generating prime numbers, generating encryption keys from the prime numbers, the prime numbers being generated by the method as previously defined.

Some embodiments also relate to an electronic device comprising a calculation block to execute multiplications of large numbers and/or modular exponentiation operations, and configured to implement the method for generating a prime number as previously defined.

Some embodiments also relate to an integrated circuit on semiconductor chip, comprising a device as previously defined.

Figure 2:
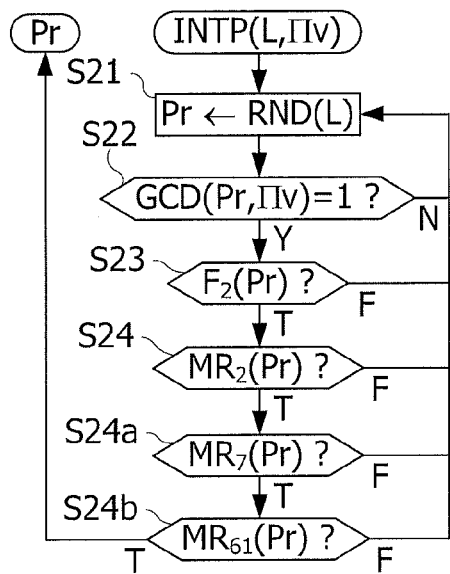
Figure 3:
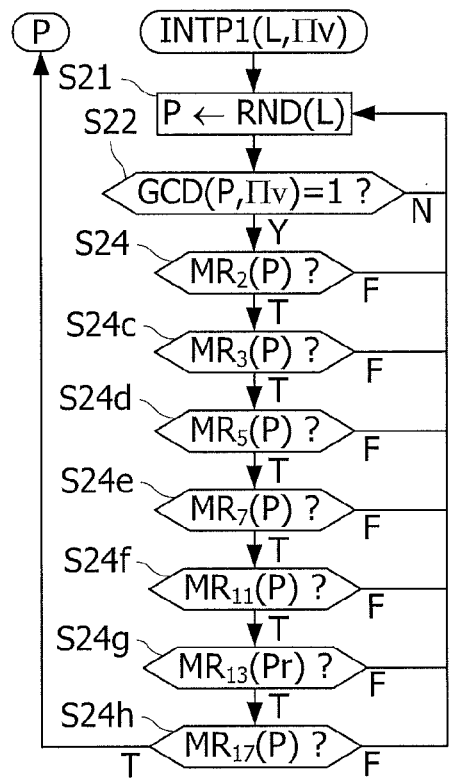
Figure 4:
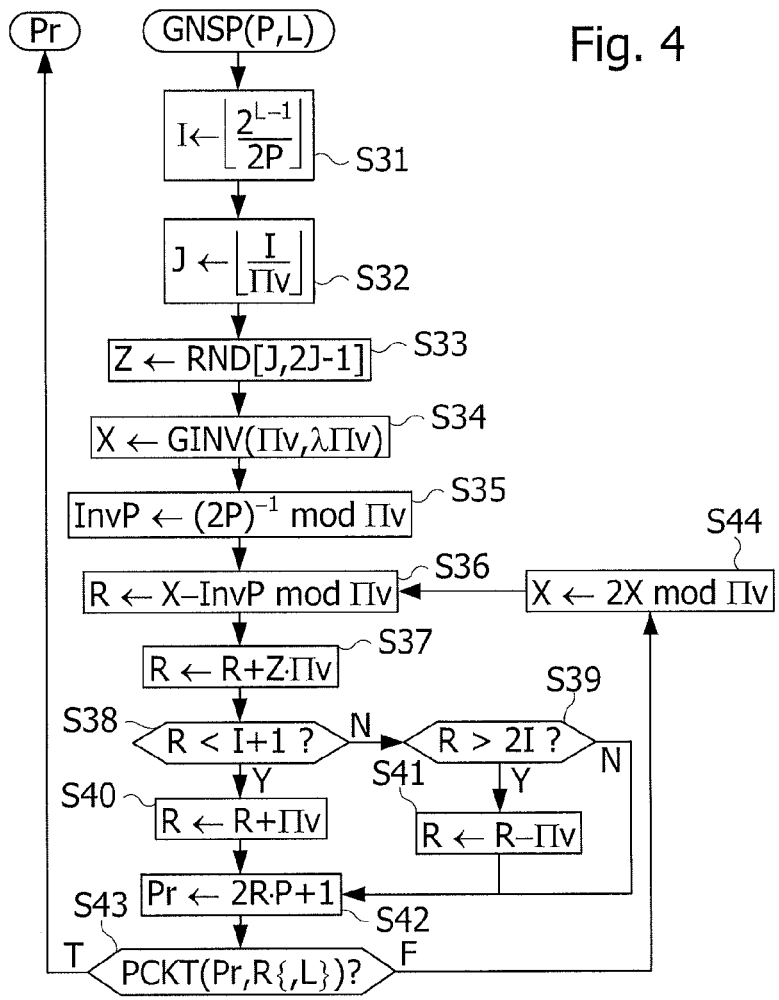
Figure 5:
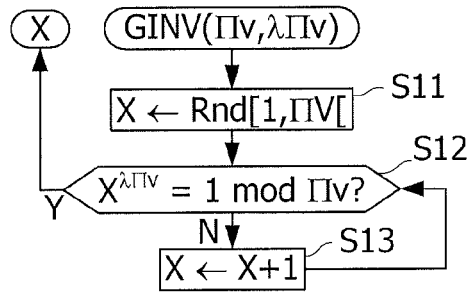
Figure 6:
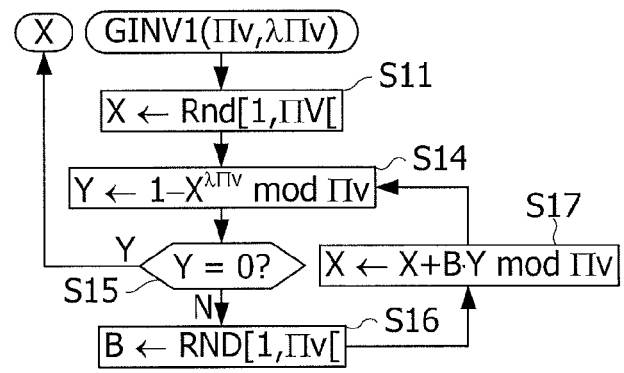
Figure 7:
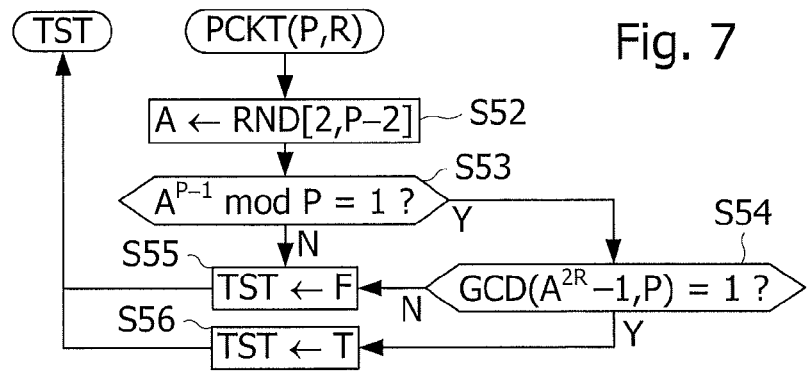
Figure 8:
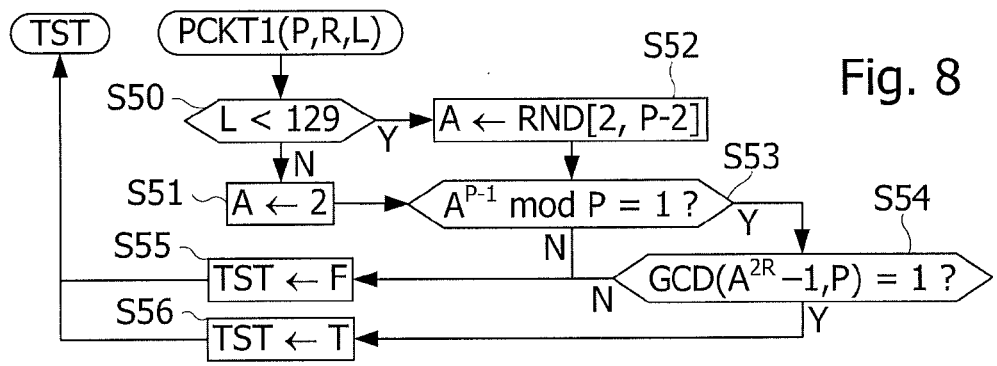
Figure 9:
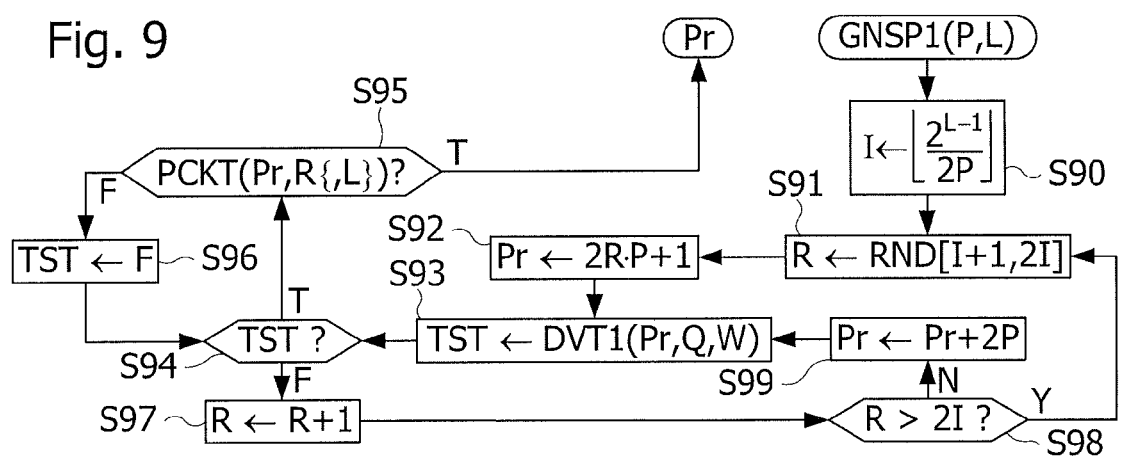
Figure 10:
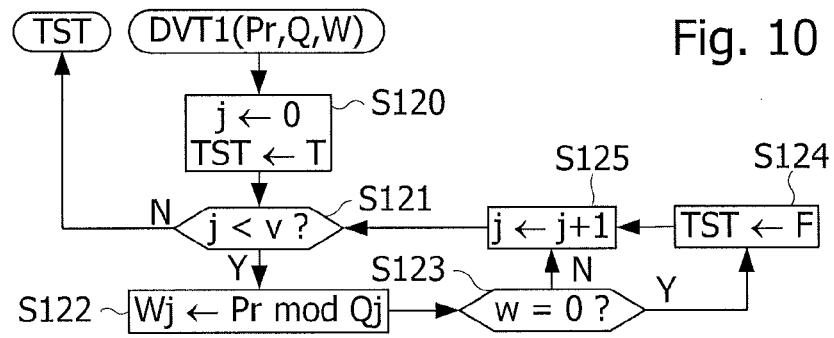
Figure 11:
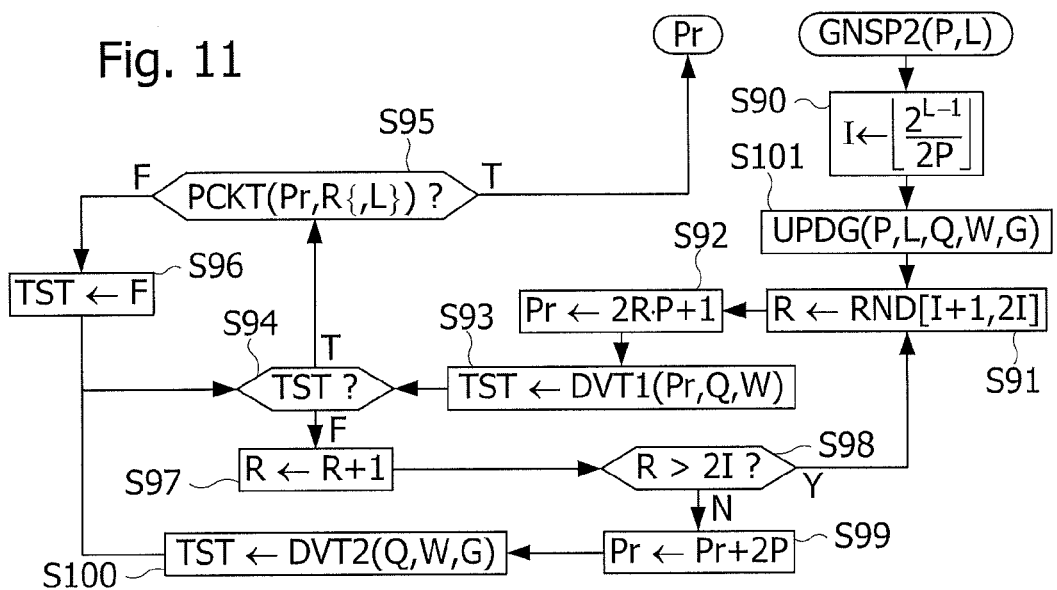
Figure 12:
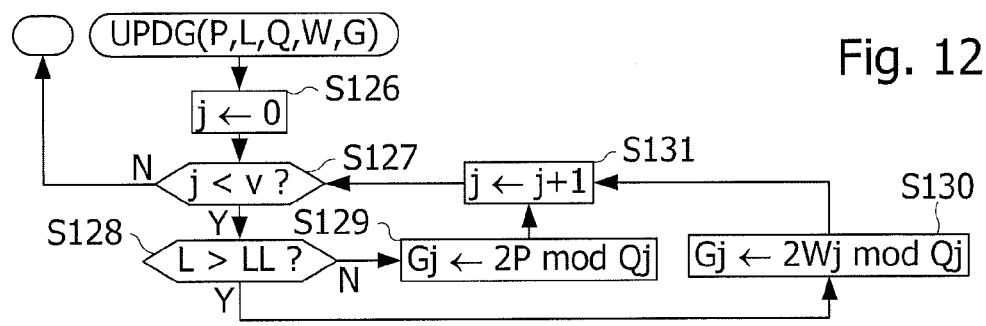
Figure 13:
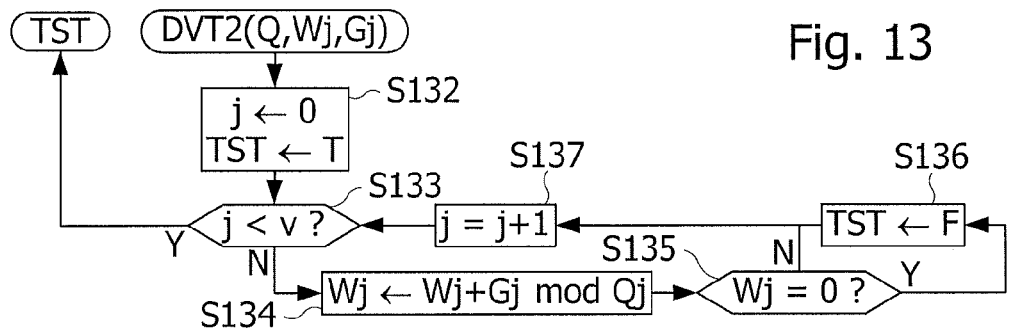
Figure 14:
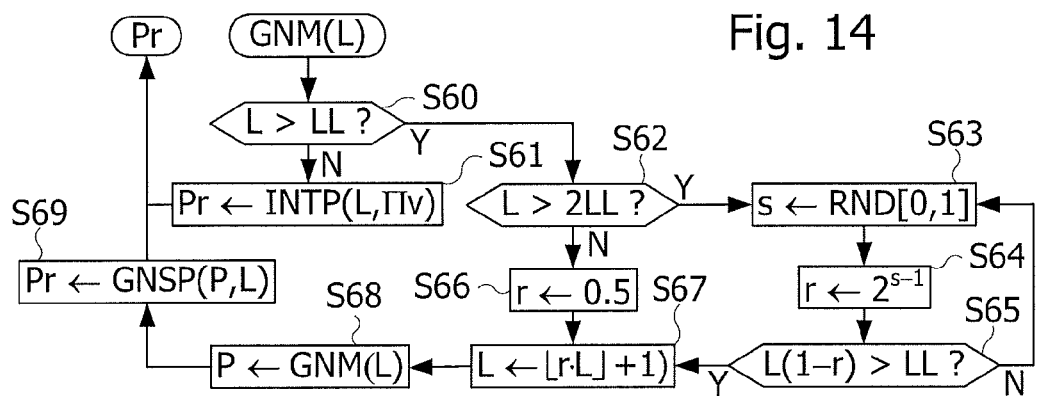
Figure 15:
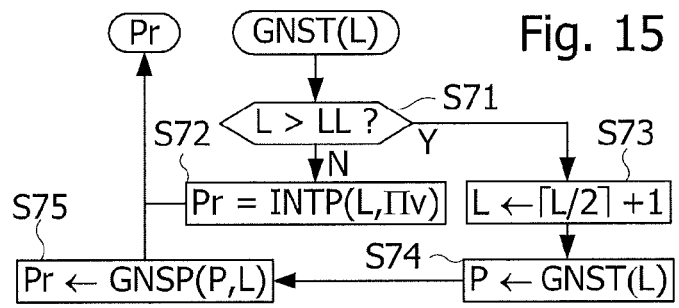
Figure 16:
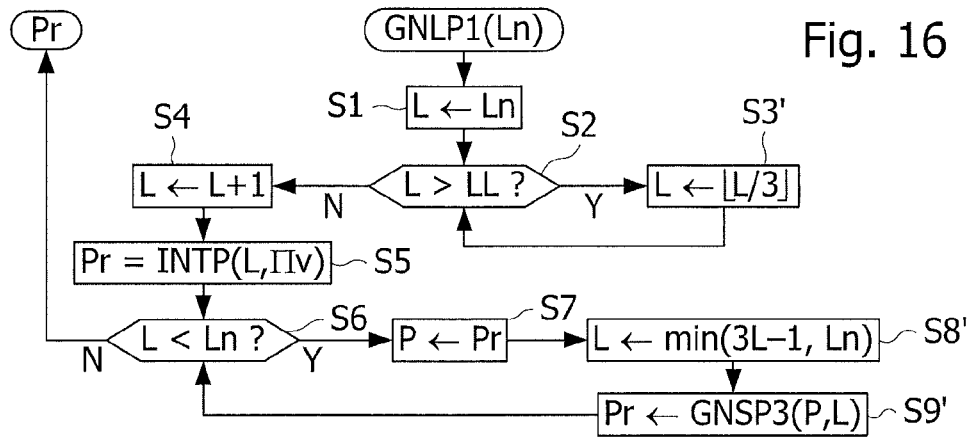
Figure 17:
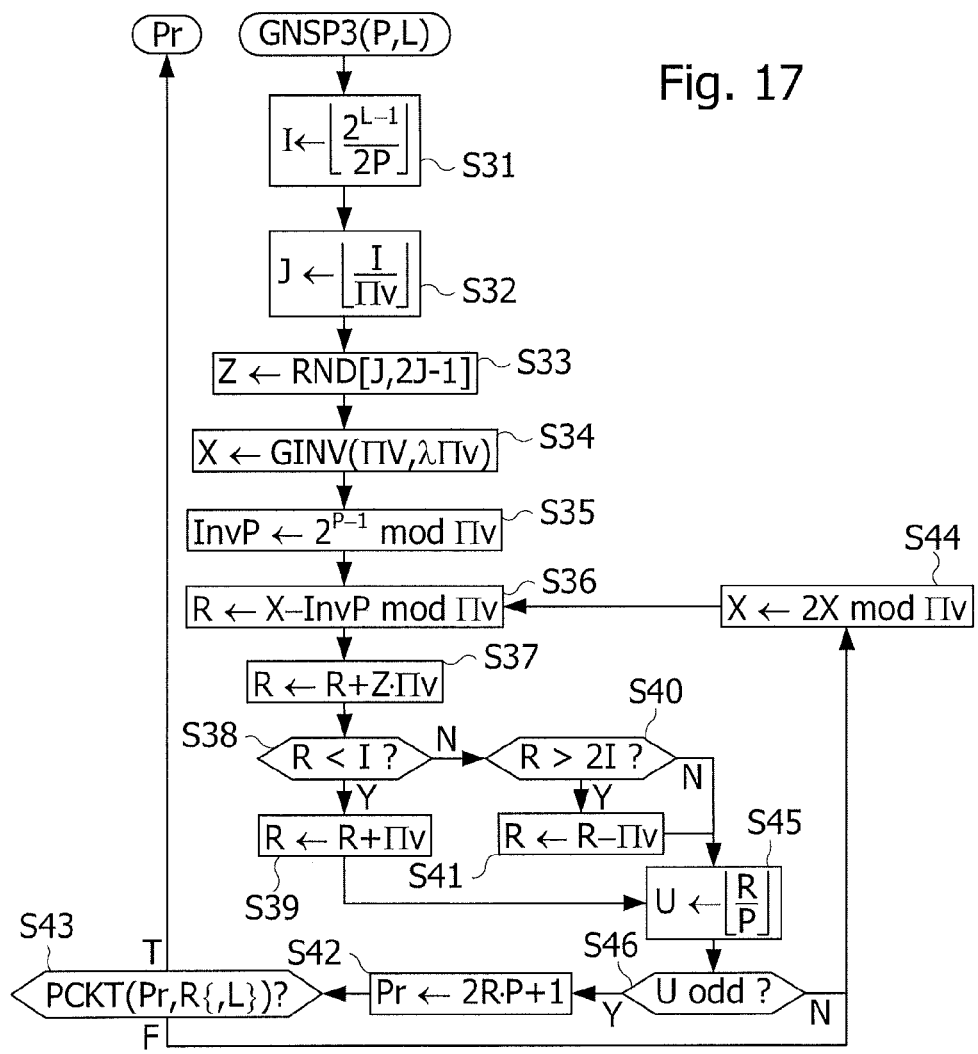
Figure 18:
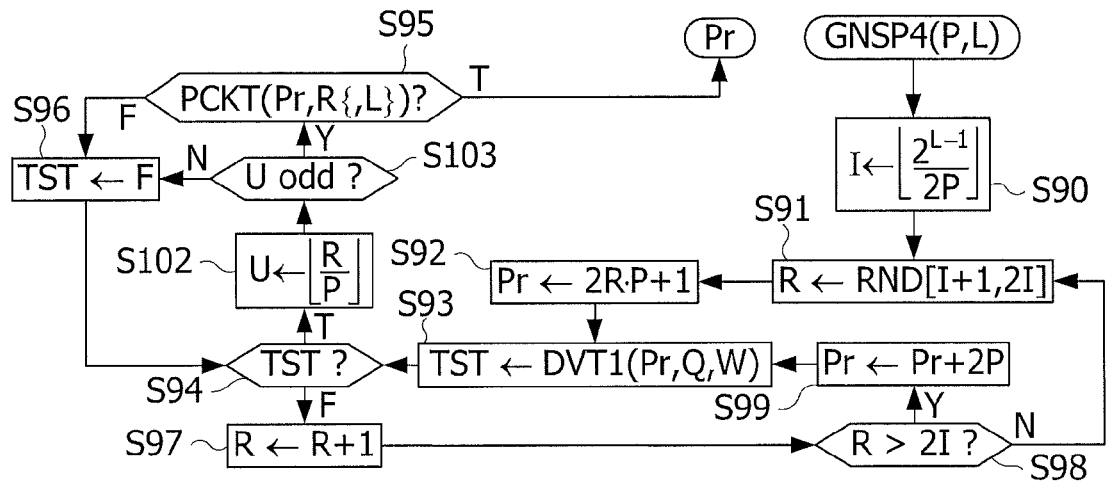
Figure 19:
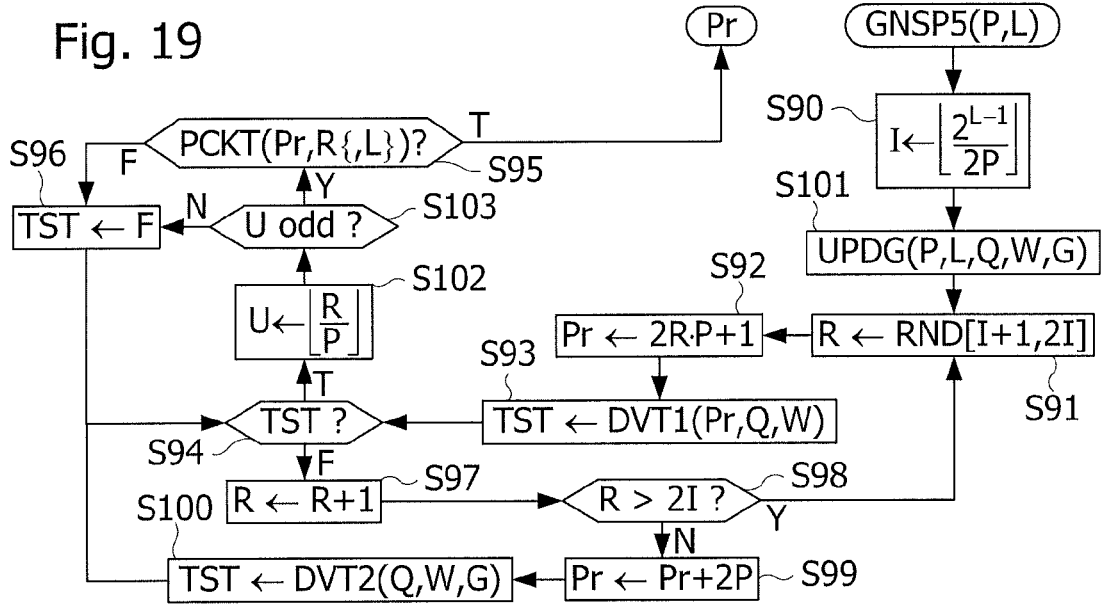
Figure 20:
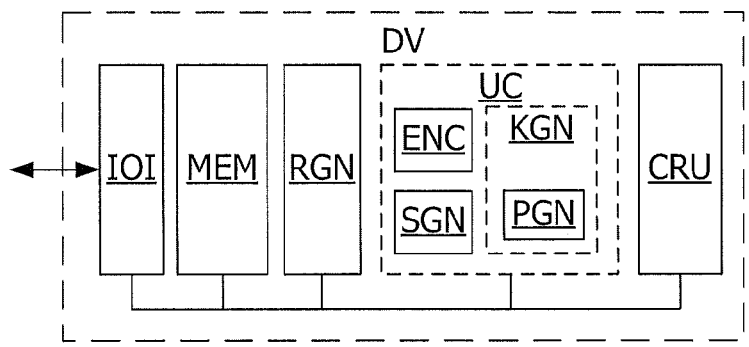

Some examples of embodiments of the present invention will be described below in relation with, but not limited to, the appended figures, in which:

FIG. 1 represents a sequence of steps configured to generate a large prime number, according to one embodiment, FIGS. 2 and 3 represent sequences of steps configured to generate a small prime number, according to one embodiment, FIG. 4 represents a sequence of steps configured to generate a prime number from a prime number of lower size, according to one embodiment, FIGS. 5 and 6 represent sequences of steps called by the sequence in FIG. 4, FIGS. 7 and 8 represent sequences of steps implementing a deterministic primality test, according to some embodiments, FIG. 9 represents a sequence of steps configured to generate a prime number from a prime number of lower size, according to another embodiment, FIG. 10 represents a sequence of steps configured to test the divisibility of a number by a list of prime numbers, FIG. 11 represents a sequence of steps configured to generate a prime number from a prime number of lower size, according to another embodiment, FIGS. 12 and 13 represent sequences of steps configured to test the divisibility of a number by a list of prime numbers, FIGS. 14 to 16 represent sequences of steps configured to generate a large prime number, according to other embodiments, FIGS. 17 to 19 represent sequences of steps configured to generate a prime number from a prime number of lower size, adapted to the sequence of steps in FIG. 16, FIG. 20 schematically represents an example of an electronic device which may implement the various sequences of steps shown in FIGS. 1 to 20, FIGS. 21 and 22 represent sequences of steps of generating encryption keys, using prime numbers.

According to one embodiment, it is provided to generate a prime number of a certain size in number of bits relying on a theorem derived from Pocklington's theorem, which is formulated as follows:

Let P be a prime number greater than 2 and R an integer lower than P, the number N obtained by the following equation:

$$N = 2R \cdot P + 1 \quad (1)$$

being prime if there is an integer A greater than or equal to 2 and lower than N such that:

$$A^{N-1} = 1 \mod N, \text{ and} \quad (2)$$

$$GCD(A^{2R}-1, N) = 1, \quad (3)$$

mod being the modulo operation and GCD(x,y) being a function providing the greatest common divisor of the numbers x and y.

This theorem enables a prime number to be obtained from a prime number of lower size. This theorem may therefore be applied in several iterations, from a small prime number obtained by another method, then from the prime number obtained during the previous iteration, until a prime number of the desired size is obtained. Given the relationship between the numbers N and P, simply choosing the size of the number R may enable a new prime number having a size substantially equal to double the size of the prime number P to be obtained. It shall be noted that the primality of the numbers obtained by applying this theorem is proven, as opposed to the probabilistic characteristic of prime numbers obtained by some known methods, for example relying on Fermat or Miller-Rabin tests.

Thus, FIG. 1 represents steps S1 to S9 of a procedure GNLP for generating a large prime number. The procedure GNLP receives as input parameter the size Ln in number of bits of the prime number to be generated. Steps S1 to S3 make it possible to determine the size L (in number of bits) of a first prime number to be generated from the size Ln of the prime number to be generated.

In step S1, the size Ln received as parameter is loaded into a local variable L. In step S2, the variable L received at input of the procedure is compared with a maximum value LL of the first prime number, for example equal to 32 or 48 bits. In steps S2 and S3, as long as the variable L is greater than the maximum size LL, the value of the variable L is divided by 2 (receives quotient of the integer division of L by 2). When the variable L is lower than the maximum size LL, the size L is incremented by one in step S4.

It shall be noted that if the memory of the circuit intended to execute the procedure GNLP makes it possible, steps S2 to S4 may be replaced with the reading of a table indexed by size Ln of prime number to be generated and giving the size L0 of the first number to be generated. Indeed, the size Ln is generally limited to a reduced number of possible values, in particular powers of 2. An example of this table when the maximum value LL is equal to 32, is given by the following Table 1:

TABLE 1

| Ln | 512 | 768 | 1,024 | 2,048 |
|----|-----|-----|-------|-------|
| L0 | 17  | 25  | 17    | 17    |
| k  | 5   | 5   | 6     | 7     |

In step S5 following step S4, a procedure INTP for determining a first proven prime number having the size L is called. The procedure receives as input parameter the variable L and optionally the product Πv of the v smallest prime numbers, for example lower than 150 (v being between 10 and 30). The procedure INTP supplies a proven prime number Pr of size L. In step S6, the variable L is compared with the size Ln of the prime number to be generated. This step marks the input of a process loop in which steps S7 to S9 are executed at each iteration of the process loop, until the size Ln of the prime number to be generated is reached. The values of k supplied in Table 1 represent the number of iterations performed by the procedure GNLP, as a function of the size Ln of the prime number to be generated.

In step S6, if the variable L is lower than the size Ln, steps S7 to S9 are executed, otherwise the procedure GNLP ends by supplying the last number Pr obtained which is a proven Ln-bit prime number. In step S7, a variable P receives the last prime number Pr obtained. In step S8, the value of the variable L is doubled to within one unit (=2L−1) without exceeding the size Ln of the prime number to be generated. Calculating the size L of the next prime number to be generated, performed in step S8, enables the condition R<P of the previously mentioned theorem to be achieved. In step S9, a procedure GNSP is called, with the variables P and L as input parameters. The procedure GNSP supplies a proven prime number Pr having the size L from the prime number P of lower size supplied at input. For this purpose, the procedure GNSP relies on Pocklington's theorem or the previously mentioned derived theorem.

According to one embodiment, the procedure INTP may implement the sieve of Eratosthenes, i.e. randomly choosing a candidate prime number having a small size for example between 16 and 24 bits, and testing the divisibility of the candidate prime number by all the prime numbers lower than the square root of the candidate prime number.

According to another embodiment, the first proven prime number Pr obtained in step S5 may be set to a certain value.

According to another embodiment, the procedure INTP may involve randomly choosing a prime number in a pre-established list of proven prime numbers having the same size set to a value lower than 33 or 49 bits.

According to another embodiment, the first proven small prime number supplied by the procedure INTP in step S5 is obtained by randomly choosing a number whose size is lower than 32 bits, and by applying the Miller-Rabin probabilistic test, successively in bases 2, 7 and 61. Indeed, Pomerance et al. (cf. publication [1]) and Jaeschke (cf. publication [2]) have shown that any integer whose size is lower than 32 bits is certainly prime, if it passes the Miller-Rabin test in bases 2, 7 and 61. The parameter LL in the procedures GNLP, GNLP1, GNM and GNST is then set to a value lower than or equal to 32 and represents the maximum size in number of bits that the prime number generated by the procedure INTP may have.

The Miller-Rabin test involves splitting up a candidate prime number N to be tested, decreased by 1, in the following manner:

$$N-1 = 2^S \times D, \quad (4)$$

S being an integer, D being an odd number, and by checking that for a number A called "base", lower than and prime with N, one of the following equations is satisfied:

$$A^D = 1 \bmod N, \quad (5)$$

$$A^{2^R D} = -1 \bmod N, \quad (6)$$

R being an integer between 0 and S−1. Thus, according to the Miller-Rabin test, the number N is probably prime if one or other of the equations (4) and (5) is satisfied. The first prime number is therefore obtained by applying the Miller-Rabin test three times, with the number A successively chosen equal to 2, 7 and 61, and by discarding the candidate numbers N not verifying the test in bases 2, 7 or 61.

According to another embodiment, applying the Miller-Rabin tests in bases 2, 7 and 61 is preceded by a step of testing the divisibility of the candidate prime number by the v smallest prime numbers, v being for example between 20 and 50. In other words, a candidate number N is discarded if it is divisible by one of the v smallest prime numbers.

According to another embodiment, applying the Miller-Rabin test in bases 2, 7 and 61 is preceded by a step of applying the Fermat probabilistic test in base 2. According to the Fermat test, the number N is probably prime if the following condition is satisfied:

$$A^{N-1} = 1 \bmod N, \quad (7)$$

where A is an integer representing the base (chosen equal to 2).

According to one embodiment, the first small prime number is obtained by executing a sequence of steps such as that represented in FIG. 2. FIG. 2 represents a procedure INTP receiving as input parameters the size L of the prime number to be generated and the product $\Pi v$ of the v smallest prime numbers, and supplying a prime number Pr of the size L, where L is lower than 32. The procedure INTP comprises steps S21 to S24b. In step S21, an odd number Pr of size L is randomly chosen using a random or pseudo-random function RND. Steps S22 to S24b are primality tests successively applied to the number Pr.

In step S22, it is sought whether the number Pr is divisible by one of the v prime numbers of the product $\Pi v$ and the test fails if the number Pr is divisible by one of the v prime numbers of the product $\Pi v$. This test may be performed by seeking the greatest common divisor GCD of the number Pr and the product $\Pi v$, the number Pr being divisible by none of the v smallest prime numbers if the greatest common divisor thus calculated is equal to 1. The product $\Pi v$ may not comprise the number 2 if the number Pr is chosen odd in step S21. Instead of receiving the product $\Pi v$, the procedure may receive the v first prime numbers in the form of a list Q, and step 22 may involve successively testing the divisibility of the number Pr by each of the prime numbers of the list Q.

According to another embodiment, $\Pi v$ represents the product of the v smallest integers (possibly greater than 2), and the divisibility test of the number Pr by one of these prime numbers may involve calculating the greatest common divisor of the numbers Pr and $\Pi v$. In step S23, the Fermat test in base 2 is applied to the number Pr. In steps S24, S24a and S24b, the Miller-Rabin tests in bases 2, 7 and 61 are respectively and successively applied to the number Pr.

If one of the tests fails, step S21 is executed again to choose another number Pr. If one of the tests is successfully executed in one of steps S22 to S24a, the next step S23 to S24b is executed. If the last primality test executed in step S24b is successfully executed, the procedure INTP ends by supplying the number Pr whose primality is thus proven. Instead of randomly choosing a new number Pr in step S21 if one of the tests performed in steps S23 to S24b fails, the number Pr may be incremented by two.

FIG. 3 represents a procedure INTP1 for generating a first small prime number, according to another embodiment. This procedure is based on the fact that a number of less than 48 bits which passed the Miller-Rabin tests in bases 2, 3, 5, 7, 11, 13 and 17, is certainly a prime number. The procedure INTP1 differs from the procedure INTP in that the Miller-Rabin primality tests in bases 7 and 61 are replaced with Miller-Rabin tests in bases 3, 5, 7, 11, 13 and 17, and in that the prime number obtained may have a size which may reach 48 bits. The maximum size LL in the procedures GNLP, GNLP1, GNM and GNST may then be set to a value lower than or equal to 48. Thus, the procedure INTP1 comprises steps S21, S22 and S24 of the procedure INTP (FIG. 14). Then, the procedure INTP1 comprises steps S24c to S24h of applying the Miller-Rabin test in bases 3, 5, 7, 11, 13 and 17. If the candidate prime number Pr chosen in step S21 passes one of the tests executed in one of steps S22, S24, S24c to S24g, the next step S24, S24c to S24h is executed. If the prime number Pr fails one of these tests, a new candidate prime number Pr is chosen in step S21. If the candidate prime number Pr verifies all the tests and in particular the Miller-Rabin test in base 17 executed in step S24g, the procedure INTP1 ends by supplying the number Pr as proven prime number.

As the procedure INTP1 may supply a prime number near 48 bits instead of a prime number near 32 bits for the procedure INTP, this procedure may reduce the number of iterations of the procedure GNLP.

It shall be noted that step S22 in the procedures INTP and INTP1 is provided to more easily discard candidate prime numbers (using less expensive operations in terms of resources and computation time) than a Fermat or Miller-Rabin test. Step S22 may therefore be omitted without affecting the proven characteristic of the number Pr supplied by the procedure INTP, INTP1. The Fermat test executed in step S23 of the procedure INTP is also provided to more rapidly discard candidate prime numbers than the Miller-Rabin test. This step may also be removed if the computation means used to implement this procedure can efficiently execute the Miller-Rabin tests (within a time acceptable for the user).

Choosing the value of the number v of the smallest prime numbers used in step S22 may be performed depending on the global execution duration of the procedure INTP or INTP1, given that the more the value v is increased, the more the execution duration of step S22 increases, and the more the global execution duration (number of executions) of the tests performed in steps S23 to S24b or S24 to S24h decreases.

FIG. 4 represents steps S31 to S43 of the procedure GNSP, according to one embodiment. Steps S31 to S39 enable an integer R to be generated such that the candidate prime number Pr obtained by the formula (1) is not divisible by the small prime numbers of the list Q. For this purpose, the following proposition constitutes a basis:

For any number x belonging to the set Z/nZ, Z being the set of integers and Z/nZ being the set of residues modulo n, the equation $x^{\lambda n}=1 \mod n$ is verified if and only if x belongs to (Z/nZ)*, i.e. if GCD(x, n)=1, λn being the Carmichael number, i.e. the smallest integer different from zero such that for any number x belonging to (Z/nZ)*, $x^{\lambda n}=1 \mod n$.

By choosing as value of n, the product Πv of the v first prime numbers greater than 2 (2 not included), it is possible to directly generate by a linear sequence of steps, in contrast with an iterative sequence, a number which is not divisible by any divisor of the product Πv, i.e. all the prime numbers forming the product Πv. The previous proposition simply requires a modular exponentiation operation raised to the power λΠv (Carmichael number of the set (Z/ΠvZ)*), and therefore storing this number as well as the product Πv. To implement this proposition, an invertible element of the set (Z/ΠvZ)* must be generated, i.e. a number X such that:

$$X^{\lambda \cdot \Pi v}=1 \mod \Pi v. \tag{8}$$

With a view to applying the formula (1), the quantity 2P(X+Z·Πv) does not have any common divisor with the product Πv either, Z being an integer. It is thus sufficient to choose the quantity 2P(X+Z·Πv) as candidate prime number Pr. The result is that the integer R in the formula (1) is chosen equal to:

$$R=(X-(2P)^{-1} \mod \Pi v)+Z \cdot \Pi v \tag{9}$$

the number Z being chosen so that the number R has a size such that the candidate prime number Pr has the size L calculated in step S8.

Steps S31 to S38 of the procedure GNSP are successively executed. In step S31, a number I is calculated using the following formula:

$$I = \left\lfloor \frac{2^{L-1}}{2P} \right\rfloor \tag{10}$$

P being a proven prime number, L being the size of a new prime number to be generated, P and L being received as input parameters of the procedure GNSP, and $$\left\lfloor \frac{x}{y} \right\rfloor$$

representing the quotient of the integer division of x by y. In step S32, a number J is calculated using the following formula:

$$J = \left\lfloor \frac{I}{\Pi v} \right\rfloor \tag{11}$$

In step S33, a number Z is chosen in the interval [J, 2J−1] using a random or pseudo-random function RND. In step S34, an invertible number X of the set (Z/ΠvZ)* is generated. For this purpose, a procedure GINV is called with as input parameters the product Πv and the associated Carmichael number λΠv. The procedure GINV supplies an invertible number X.

Steps S35 to S41 enable the number R to be calculated. In step S35, a number InvP is calculated which is equal to the inverse number modulo the product Πv, of twice the prime number P (i.e. $(2P)^{-1} \mod \Pi v$). In step S36, a number R is calculated that is equal to the number X minus the inverse number InvP modulo the product Πv. In step S37, the number R is incremented by the quantity Z·Πv. In steps S39 to S41, it is checked that the number R obtained in step S37 is within the interval [I+1,2I], to obtain a candidate prime number Pr of the size L. Thus, in steps S38 and S39, the number R is compared with the numbers I+1 and 2I. If the number R is lower than I+1, the steps S40 and S42 are executed. If the number R is greater than 2I, the steps S41 and S42 are executed. If the number R is between I+1 and 2I, only step S42 is executed. In step S40, the number R is incremented by the quantity·Πv. In step S41, the number R is decremented by the quantity·Πv.

In step S42, a candidate prime number Pr is calculated using the formula (1) and the number R obtained in step S37, S40 or S41 and the prime number P received as calling parameter of the procedure GNSP. In step S43, a procedure for applying the Pocklington test PCKT is called. This procedure receives the number Pr to be tested and the number R used to calculate the number Pr in step S42, as well as optionally the size L in number of bits of the number Pr. This procedure sends back a Boolean variable set to "T" ("True") if the number Pr passes the Pocklington test, and "F" ("False") otherwise. If the procedure PCKT returns "True", the number Pr is certainly prime and the procedure GNSP ends by supplying the number Pr. If the procedure PCKT returns "False", step S44 is executed and the execution of the procedure continues at step S36. In step S44, the number X is multiplied by 2 modulo the product Πv.

A method for generating invertible numbers is described in the document [7]. FIG. 5 represents steps S11 to S13 of the procedure for generating an invertible number GINV, according to one embodiment. The procedure GINV enables an invertible element of the set (Z/ΠvZ)* to be generated by an iterative method. In step S11, an integer X lower than the product Πv is chosen using a random or pseudo-random function. In step S12, it is tested whether the number X chosen in step S11 verifies the equation (8), i.e. whether the number X is invertible in the set (Z/ΠvZ)*. If the number X verifies the equation (8), the procedure GINV ends by supplying the number X, otherwise step S13 is executed. In step S13, the number X is incremented by 1. Steps S12 and S13 form a process loop which is executed until the condition of step S12 is satisfied.

FIG. 6 represents another embodiment GINV1 of the procedure GINV. The procedure GINV1 differs from the procedure GINV in that steps S12 and S13 are replaced with steps S14 to S17. In step S14, a number Y is calculated using the following equation:

$$Y = 1 - X^{\lambda \cdot \Pi v} \mod \Pi v. \quad (12)$$

In step S15, the number Y is compared with 0, and if it is zero, the number X verifies the equation (8). The procedure GINV1 then ends by supplying the number X. In the opposite case, steps S16, S17 are executed. In step S16, a number B lower than the product Πv is randomly chosen. In step S17, the number X is incremented by the product of the numbers B and Y. The execution of the procedure GINV1 then continues at step S14 to test whether the number X verifies the equation (8).

FIG. 7 represents steps S52 to S56 of the procedure PCKT, according to one embodiment. This procedure successively applies to the numbers P and R received at input by the procedure PCKT the tests corresponding to the equations (2) and (3). If the numbers P and R pass both tests, the procedure PCKT returns "True", otherwise "False". In step S52, an integer A is chosen using a random or pseudo-random function RND in the interval [2, P−2]. In step S53, if the number P verifies the equation (2), step S54 is executed, otherwise step S55 is executed. In step S54, if the numbers P and R verify the equation (3), step S46 is executed, otherwise step S55 is executed. In step S55, a Boolean variable TST is set to "False". In step S56, the variable TST is set to "True". The procedure PCKT ends after step S55 or S56 by returning the variable TST.

It shall be noted that the equation (3) tested in step S54 may be implemented by first calculating the quantity $B = A^{2R} - 1 \mod P$, then by calculating GCD (B, P).

FIG. 8 represents another embodiment PCKT1 of the procedure PCKT in FIG. 7. The procedure PCKT1 differs from the procedure PCKT in that it comprises additional steps S50 and S51 of forcing the number A to 2 (step S51) if the size L of the number P received as input parameter of the procedure is greater than or equal to a certain value, for example equal to 129 (step S50). Forcing the number A to 2 enables the modular exponentiation operations to be performed more rapidly in steps S53 and S54 when the numbers P and R are large. Indeed, when the number A is set to 2, numbers in the form $2^n$ must then be calculated, which may be performed by simple bit shifts in a binary word, accelerating the execution of Pocklington tests by a microcircuit. If it is assumed that the proportion of prime numbers rejected by setting the value of the number A does not change as a function of this value, setting the value of A to a constant value such as 2 has an insignificant impact on the distribution of the generated prime numbers when the size of the number P to be tested is large enough (for example greater than 128 bits). Indeed, it has been proven that the probability that the choice of a certain value of A causes the rejection of a prime number in step S53 is equal to 1/P. Consequently, the larger the number P, the lower this probability. From L=128, which corresponds to a number P of 64 bits, this probability becomes insignificant.

According to one embodiment, another procedure for generating a prime number may be called in step S9 for the first iterations of the procedure GNLP, the procedure GNSP being called only during the next and last iterations. The procedure called at the first iterations may involve choosing a number R to calculate a candidate prime number Pr using the formula (1), and testing the divisibility of the number Pr by the prime numbers of the product Πv, instead of generating a number R such that the number Pr obtained is not divisible by the prime numbers of this product.

FIG. 9 represents steps S90 to S99 of such a procedure GNSP1, according to one embodiment. Steps S90 to S94 are successively executed. In step S90, a number I is calculated using the formula (10). In step S91, an integer R is chosen using a random or pseudo-random function RND in the interval [I+1,2I]. In step S92, a candidate prime number Pr is calculated using the formula (1). In step S93, a procedure DVT1 for testing the divisibility of the number Pr by the prime numbers of the list Q is called. The procedure DVT1 receives as input parameters the number Pr, the list Q, and a table W, and supplies a Boolean variable TST set to "True" if the number Pr is not divisible by the numbers of the list Πv and otherwise set to "False". In step S94, the variable TST is tested. If the variable TST is set to "True", step S95 is executed, otherwise step S97 is executed.

In step S95, the procedure for applying the Pocklington test PCKT (or PCKT1) is called. This procedure receives the number Pr to be tested and the number R used to calculate the number Pr in step S92, as well as optionally the size L in number of bits of the number Pr. This procedure sends back a Boolean variable set to "True" if the number Pr passes the Pocklington test, and "False" otherwise. If the procedure PCKT returns "True", the number Pr is certainly prime, and the procedure GNSP ends by supplying the number Pr. If the procedure PCKT returns "False", the variable TST is set to "False" in step S96 and the execution of the procedure GNSP continues at step S97.

In step S97, the number R is incremented by 1. In step S98, the number R is compared with the number 2I, so that R remains within the interval [I+1,2I]. If the number R is greater than the number 2I, the execution of the procedure GNSP1 continues at step S91 to randomly choose a new number R in the interval [I+1,2I], to calculate a new candidate prime number Pr and to test it. If in step S98, the number R is lower than or equal to the number 2I, step S99 instead of step S92 is executed to update the number Pr given the incrementation of the number R in step S97. Thus in step S99, the number Pr is merely incremented by twice the prime number P. This calculation results from the incrementation of the number R performed in step S97 and from the formula (1). In this way, the number Pr may simply be updated by a binary shift of P followed by an addition, instead of performing the multiplication of large integers as provided in step S92 implementing the formula (1). After step S99, the execution of the procedure GNSP1 continues at step S93.

Thus, steps S93 to S99 form a first process loop in which the number R is incremented by one at each iteration, up to the value 2I, if any, and in which the primality of the number Pr corresponding to the number R is tested in a proven manner. Steps S91 to S99 form a second process loop enabling the first loop to be executed with a new value of R randomly chosen in the interval [I+1,2I]. As long as the number Pr obtained in step S92 or S99 does not satisfy the non-divisibility and Pocklington tests, a new candidate prime number is determined in steps S91 and S92 or S99. It shall be noted that steps S97 to S99 may be omitted, step S91 being directly executed if the variable TST is set to "False" in step S94.

FIG. 10 represents steps S120 to S125 of the procedure DVT1, according to one embodiment. In step S120, a loop index j is set to 0 and a Boolean variable TST is set to "True". The next step S121 forms the input of a loop comprising steps S122 to S125. This loop enables the divisibility of the number Pr by each of the numbers Qj of the list Q, to be tested. In step S121, the index j is compared with the number v of prime numbers in the list Q. If the index j is lower than the number v, a loop iteration beginning in step S122 is executed, otherwise, the procedure DVT1 ends by supplying the variable TST. In step S122, a variable Wj stored in a location of index j in the table W, receives the remainder of the integer division of the number Pr by the number Qj. The variable Wj can thus be calculated using the following formula:

$$Wj = Pr \bmod Qj \tag{13}$$

In step S123, the variable w is compared with 0. If the variable w is zero, meaning that the candidate number Pr is divisible by the number Qj, steps S124 and S125 are executed, otherwise only step S125 is executed. In step S124, the variable TST is set to "False", to indicate that the number Pr is not a prime number. In step S125, the index j is incremented by one. Step S121 is executed after step S125 either to execute a new iteration or to supply the variable TST at the end of the execution of the procedure DVT1. It shall be noted that for the procedure GNSP1, it is not necessary to store the remainders Wj in a table. The remainder obtained in step S122 can therefore merely be loaded into a register to be able to be compared with 0 in step S123.

FIG. 11 represents another embodiment GNSP2 of the procedure GNSP1 in FIG. 9. The procedure GNSP2 differs from the procedure GNSP1 in that it comprises calculation optimizations in the divisibility tests of the number Pr by the prime numbers of the list Q. Therefore, the procedure GNSP2 comprises an additional step S100 executed between steps S99 and S94, and an additional step S101 executed between steps S90 and S91.

In step S101, a procedure UPDG is called with as input parameters the prime number P, the size L of the number Pr (in number of bits), the list Q, the table W and a table of values G. The table G is provided for receiving the remainders of the divisions of twice the number P by each of the numbers Qj. The number of values in each table W, G corresponds to the number v of prime numbers in the list Q. The procedure UPDG is provided for updating the table G. In step S100, a procedure DVT2 is called with as input parameters the list Q, and the tables of values W and G. The procedure DVT2 enables the table W to be updated only by operations involving small numbers, and the divisibility of the candidate prime number Pr updated in step S99 to be tested.

FIG. 12 represents steps S126 to S131 of the procedure UPDG. In step S126, a loop index j is set to Q. Step S127 which forms the input point of a loop comprising steps S128 to S131, compares the index j with the number v of prime numbers in the list Q. This loop enables the table G to be updated. If the index j is lower than the number v in step S127, a loop iteration beginning at step S128 is executed, otherwise the execution of the procedure UPDG is over. In step S128, it is determined whether the procedure (GNSP2) having called the procedure UPDG, is called for the first time by the procedure GNLP, in other words whether the number P received as calling parameter of the procedure GNSP2 has been determined for example by the procedure INTP. This condition may be determined from the size L of the prime number P, supplied as calling parameter of the procedure GNSP2, given the calculation of the size of the first prime number compared with the maximum size LL, performed by the procedure GNLP (steps S2 to S4). If the size L corresponds to that of the first prime number supplied by the procedure INTP, steps S129 and S131 are executed, otherwise steps S130 and S131 are executed. In step S128, the value Gj of index j in table G is calculated using the following formula:

$$Gj = 2P \bmod Qj \tag{14}$$

Qj being a prime number of rank j in the list Q. In step S130, the value Gj is calculated using the following formula:

$$Gj = 2Wj \bmod Qj \tag{15}$$

Wj being a value of index j in the table W previously obtained in step S122, or in another step S134 described below, during a previous call of the procedure GNLS2. The tables W and G containing the values Wj and Gj are therefore stored in so-called "global" variables which are not erased at each call of the procedure GNSP2. The implementation of the formula (15) is also a calculation simplification compared with the formula (14) executed in step S129. Indeed, the formula (15) involves dividing small numbers, whereas the formula (14) involves dividing a large number (2P) by a small number Qj. In step S131, the index j is incremented by one. Step S127 is executed after step S131.

It shall be noted that step S122 (FIG. 10) can also be simplified by first calculating the quantity Rj=R mod Qj, given that the number R has a size lower than half of the candidate prime number Pr. Each number Wj in the table W is then equal to (Gj·Rj+1) mod Qj, the numbers Rj and Gj being lower than the number Qj which may have a size limited to 8 or 16 bits.

FIG. 13 represents steps S132 to S137 of the procedure DVT2, according to one embodiment. In step S132, a loop index j is set to 0 and a Boolean variable TST is set to "True". The next step S133 forms the input point of a loop comprising steps S134 to S137. This loop enables the divisibility of the number Pr by each number Qj of the list Q to be tested, when the number Pr has been incremented by 2P in step S99 of the procedure GNSP2. This loop also enables the table of values W to be updated, given the modification of the number Pr in step S99.

In step S133, the index j is compared with the number v of prime numbers in the list Q. If the index j is lower than the number v, a loop iteration beginning in step S134 is executed, otherwise the procedure DVT2 ends by supplying the variable TST. In step S134, the table W at the index j is updated using the following formula:

$$Wj = Wj + Gj \bmod Qj \tag{16}$$

which corresponds to the formula (13) given the update of the number Pr performed in step S99. The implementation of the formula (16) is also a calculation simplification compared with the formula (13) executed in step S134. Indeed, the formula (16) only comprises an addition of small numbers, possibly followed by a subtraction of the small number Qj if Wj+Gj>Qj, whereas the formula (13) involves dividing a large number (Pr) by a small number (Qj), such a division requiring much more calculation time and memory resource.

In step S135, the value Wj of index j in the table W is compared with 0. If the value Wj is zero, meaning that the candidate number Pr is divisible by the number Qj, steps S136 and S137 are executed, otherwise only step S137 is executed. In step S136, the variable TST is set to "False", to indicate that the number Pr is not a prime number. In step S137, the index j is incremented by one. Step S133 is executed after step S137.

It shall be noted that choosing the number v of the smallest prime numbers used in steps S123, S128, S129 and S133 may also be performed as a function of the global execution duration of the procedure GNLP calling the procedure GNSP2, given that the more the value v is increased, the more the execution duration of the procedures DVT1, DVT2 increases, and the more the global execution duration of the tests performed in step S95 decreases. The number v may be chosen at a value between 100 and 200. It shall be noted that the number v chosen for the procedure GNSP2 may be applied to the procedure INTP or INTP1 executed in step S5.

FIG. 14 represents another iterative procedure GNM for generating a prime number of large size Ln. This procedure substantially corresponds to the Maurer procedure (cf. publication [3]). In FIG. 14, this procedure receives as input parameter a size L of the prime number to be generated and supplies a prime number Pr. This procedure comprises steps S60 to S69. In step S60, the size L is compared with a maximum size LL of prime number below which a procedure for generating a first proven prime number may be used without requiring excessive time and computation power abilities. If the size L is greater than the maximum size LL, step S61 is executed, otherwise step S62 is executed. In step S61, a prime number Pr having a size lower than the size LL is obtained. The procedure GNM then ends by supplying the number Pr. The method for obtaining a first prime number having a size lower than the size LL may be one of those previously described (step S5).

Steps S62 to S67 make it possible to determine a sequence of sizes of intermediate prime numbers between the initial size of the first prime number and the size of the prime number to be generated supplied as input parameter of the procedure GNM. In step S62, the size L is compared with twice the maximum size LL (2LL). If the size L is greater than 2LL, in other words, for the large values of L, steps S63 to S65 and S67 are executed, otherwise only steps S66 and S67 are executed. In step S63, a real number s between 0 and 1 is randomly or pseudo-randomly chosen. In step S64, a real number r is calculated by raising 2 to the power s−1. Thus, the number to r is between ½ and 1. In step S65, the size L multiplied by the real number (1−r) is compared with the maximum size LL. If the quantity L(1−r) is greater than the size LL, step S67 is executed, otherwise steps S63 to S65 are executed again. In other words, step S63 marks the input of a process loop comprising steps S63 to S65 in which a new value of r is calculated until the condition of step S65 is verified. In step S66, for the values of L between LL and 2LL, the real number r is set to 0.5.

In step S67, a new size L is calculated by multiplying the current value of L by the real number r, taking the integer part of the result obtained, and adding 1 to the integer part. In step S68, the procedure GNM is called with the new value of the size L obtained in step S67. Thus, the procedure GNM is a recursive procedure. In step S69, the procedure GNSP is called to obtain a prime number Pr of size L, from the prime number P obtained in step S68. The procedure GNM ends after step S69 by supplying the prime number Pr supplied by the procedure GNSP called in step S69.

FIG. 15 represents another iterative procedure GNST for generating a prime number of large size Ln. This procedure substantially corresponds to the Shawe-Taylor procedure (cf. publication [4] or [5]). In FIG. 15, this procedure receives as input parameter the size L of the prime number to be generated and supplies a prime number Pr. This procedure comprises steps S71 to S75. In step S71, the size L is compared with the maximum size LL. If the size L is greater than the size LL, steps S73 to S75 are executed, otherwise step S72 is executed. In step S72, a small prime number Pr of size lower than the size LL is generated and the procedure ends by supplying the prime number Pr.

In step S73, the size L is decreased by adding 1 to the smallest integer greater than or equal to the size L divided by two. In step S74, the procedure GNST is called with the new value of L to obtain a prime number P of size L. The procedure GNST is therefore also recursive. In step S75, the procedure GNSP is called to obtain a prime number Pr of size L with as input parameters, the previous prime number P supplied by calling the procedure GNST in step S74, and the size L obtained in step S73. The prime number Pr obtained in step S75 is supplied at output of the procedure GNST which finishes at the end of this step.

To generate a first small prime number, the procedures GNM and GNST may proceed in the same way as the procedure GNLP. Like the procedure GNLP, the procedures GNM and GNST may also call at their first iterations the procedure GNSP1 or GNSP2, and at their last iterations the procedure GNSP.

FIG. 16 represents another embodiment GNLP1 of the procedure GNLP in FIG. 1. The procedure GNLP1 differs from the procedure GNLP in that steps S3, S8 and S9 are replaced with steps S3', S8' and S9'. In step S3', the value of the variable L is divided by 3 instead of 2. In step S8', the value of the variable L is tripled (=3L−1), to within one unit, without exceeding the size Ln of the prime number to be generated. In step S9', a procedure GNSP3 is called, with the variables P and L and optionally the list Q as input parameters. The procedure GNSP3 supplies a prime number Pr having the size L from the prime number P of lower size.

The procedure GNLP1 relies on a theorem deriving from the theorem proven by Brillhart, Lehmer, Selfridge, Tuckerman and Wagstaff in 1988 (cf. publication [6]). The derived theorem is formulated as follows:

Let P be a prime number greater than 2 and R an integer lower than $P^2+1$. The number $N=2R \cdot P+1$ is prime if there is an integer A greater than or equal to 2 and lower than or equal to N such that:

(i) A, N and R satisfy the equations (2) and (3),
(ii) the quotient of the integer division of R by P, $$\left\lfloor \frac{R}{P} \right\rfloor,$$

is odd.

The condition $R<P^2+1$ is substantially satisfied by the operation executed in step S8' to determine the size of the next prime number to be generated.

It shall be noted that if the memory of the circuit intended to execute the procedure GNLP1 makes it possible, steps S2, S3' and S4 may be replaced with the reading of a table indexed by size Ln of prime number to be generated and giving the size L0 of the first number to be generated. An example of this table when the maximum value LL is equal to 32, is given by the following Table 2:

TABLE 2

| Ln | 512 | 768 | 1,024 | 2,048 |
|---|---|---|---|---|
| L0 | 20 | 29 | 14 | 26 |
| k | 3 | 3 | 4 | 4 |

Table 2 also supplies the values of the number k of iterations executed by the procedure GNLP1 from step S6.

If Tables 1 and 2 are compared, the procedure GNLP1 enables a prime number of the desired size to be obtained in a number of iterations reduced by 2 or 3 iterations compared with the procedure GNLP.

FIG. 17 represents the procedure GNSP3 called by the procedure GNLP1 in FIG. 16. The procedure GNSP3 differs from the procedure GNSP in that it comprises two additional steps S45 and S46, to implement the test (ii) of the previously mentioned theorem, given that the test (i) is implemented by step S43. Steps S45 and S46 are executed after one of steps S39 to S41 and before step S42. In step S45, the quotient U of the integer division of the number R by the number P is calculated. In step S46, if the quotient U is even, step S44 is executed to generate a new value of X and of R, otherwise step S42 is executed.

According to one embodiment, like for the procedure GNLP, another procedure for generating a prime number may be called in step S9' for the first iterations of the procedure GNLP1, the procedure GNSP3 being called only during the next and last iterations. The procedure called at the first iterations involves choosing a number R to calculate a candidate prime number using the formula (1), and testing the divisibility of the number Pr by the prime numbers of the list Q, instead of generating a number R such that the number Pr obtained is not divisible by any prime number of this list.

Thus, FIG. 18 represents a procedure GNSP4 which may be called by the procedure GNLP1 in FIG. 16, in step S9', during the first iterations of the procedure GNLP1. The procedure GNSP4 differs from the procedure GNSP1 in that it comprises two additional steps S101 and S102, to implement the test (ii) of the previously mentioned theorem, given that the test (i) is implemented by step S95. Steps S101 and S102 are executed between steps S94 and S95. In step S101, the quotient U of the integer division of the number R by the number P is calculated. In step S102, if the quotient U is even, the execution of the procedure GNSP4 continues at step S96 to generate a new value of R, otherwise step S95 is executed.

The procedure GNSP2 may be modified in the same way as the procedure GNSP1 to implement steps S102 and S103. Thus, FIG. 19 represents a procedure GNSP5 which may be called by the procedure GNLP1 during the first iterations thereof. The procedure GNSP5 differs from the procedure GNSP2 in that it comprises steps S102 and S103 which are executed as in the procedure GNSP4, after step S94 and before step S95 or S96.

FIG. 20 represents an example of electronic device DV in which the various embodiments of the previously described prime number generation method may be implemented. The device DV may be an integrated circuit on semiconductor chip, generally forming a microprocessor. The chip may for example be arranged on a medium such as a plastic card, the assembly forming a smart card.

The device DV comprises a processing unit UC, an encryption calculation block CRU, and one or more memories MEM which may comprise a volatile memory and a non-volatile memory. The electronic device DV also comprises a communication interface 101 of the contact or contactless type, for example a circuit RF or UHF operating by inductive coupling or by electrical coupling. The block CRU may be a coprocessor equipped with a programmable central control unit of the state machine type, a full hardware coprocessor, or subprograms executed by the unit UC.

According to one embodiment, the calculation block CRU may be configured to perform upon request from the unit UC multiplications of large numbers, for example having a size between 32 and 2,048 bits, and in particular the one performed in steps S42 and S92 of the procedures GNSP, GNSP1 to GNSP5, as well as those involved in the modular exponentiation calculations of the Fermat and Miller-Rabin tests executed in the procedures INTP, INTP1, and of the Pocklington test executed in the procedures PCKT and PCKT1.

According to another embodiment, the calculation block may also be configured to directly perform upon request from the processing unit UC, the modular exponentiation operations of the Fermat and Miller-Rabin tests executed in the procedures INTP, INTP1, and of the Pocklington test executed in the procedures PCKT and PCKT1.

The device DV may also comprise a random or pseudo-random generator RGN of M-bit binary words to perform steps S21, S33, S11, S91 and S63.

The unit UC may thus comprise a prime number generation module PGN implementing one of the procedures GNLP, GNLP1, GNM, GNST. The unit UC may also comprise a module KGN for generating encryption data such as encryption keys, and signature SGN and ciphering ENC modules using encryption data generated by the module KGN. Each module PGN, KGN, ENC, SGN may use the block CRU to perform complex operations, such as multiplications of large numbers or modular exponentiations. The generated encryption data is stored in the memory MEM.

Figure 21:
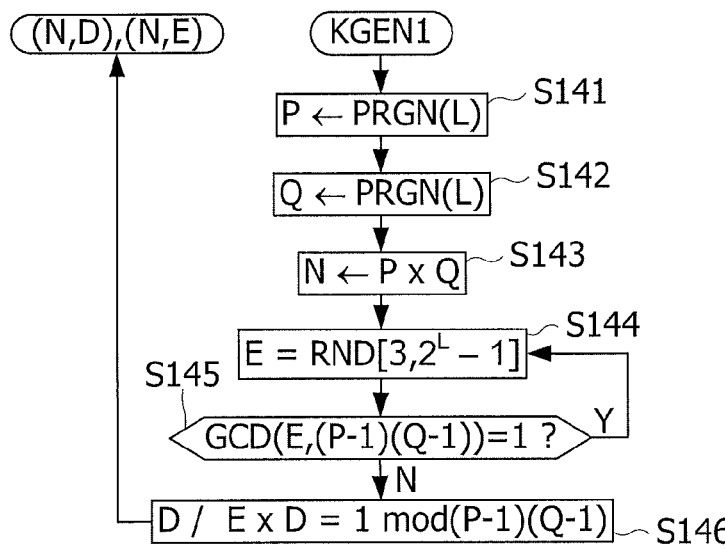

The modules KGN, SGN and ENC may for example implement the RSA algorithm by generating two prime numbers of 512 or 1,024 bits using the module PGN. FIG. 21 represents a procedure KGEN1 for generating a pair of secret and public keys, complying with the RSA algorithm, executed by the module KGN. The procedure KGEN1 comprises steps S141 to S146. In steps S141 and S142, two prime numbers P and Q are generated using a procedure PRGN receiving as input parameter the size L of the prime numbers to be generated. The procedure PRGN corresponds to one of the procedures GNLP, GNLP1, GNM, GNST executed by the module PGN. In step S143, the numbers P and Q are multiplied one by the other to obtain a number N. In step S144, an odd number E is randomly chosen in a certain interval, for example between 3 and $2^L-1$. In step S145, if the number E chosen is not invertible modulo the quantity (P−1)(Q−1), a new number E is chosen in step S144, otherwise step S146 is executed to choose a number D such that E×D is equal to 1 modulo (P−1)(Q−1). The procedure KGEN1 ends after step S146 by supplying as private key the pair of numbers (N,D) and as public key the pair of numbers (N,E).

Figure 22:
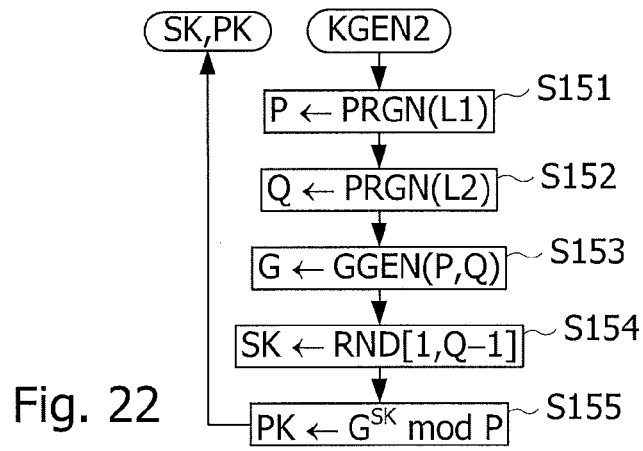

The DSA algorithm may also be implemented by the modules KGN, SGN and ENC, by generating two prime numbers of different sizes, for example 256 and 2,048 bits. FIG. 22 represents a procedure KGEN2 for generating a pair of secret and public keys, complying with the DSA algorithm, executed by the module KGN. The procedure KGEN2 comprises steps S151 to S155. In steps S151 and S152, two prime numbers P and Q are generated using a procedure PRGN successively receiving as input parameter the sizes L1, L2 of the prime numbers P and Q to be generated. The sizes L1 and L2 are for example equal to respectively 2,048 and 256 bits. In step S153, a procedure GGEN is called to generate a number G which constitutes a number generating the sub-group of order Q modulo P. In step S154, a secret key SK is randomly chosen in the interval [1, Q−1]. In step S155, a public key PK is calculated by raising number G to the power SK modulo P. The procedure KGEN2 ends after step S155 by supplying the pair of private and public keys (SK, PK).

It will be understood by those skilled in the art that the present invention is susceptible of various alternative embodiments and various applications, in particular various other forms of algorithms and devices implementing such algorithms. Thus, the invention also comprises all the possible combinations of the various embodiments described.

The invention is not limited either to an iterative method of generating a large prime number. Indeed, it may be considered to store a prime number having a size substantially equal to half or a third of the prime numbers to be generated and to execute a single iteration corresponding to the execution of one of the procedures GNSP and GNSP1 to GNSP3. Compared with the solution consisting in directly storing a prime number that can be used to generate encryption keys, this solution has a gain in terms of storage capacity equal to half or two thirds of the size of the prime numbers used. This solution also has an advantage in terms of security and confidentiality, since it is not possible to know in advance the prime number(s) which will be used to generate the encryption keys. Indeed, even if the previous prime number is fixed, the random choice of the integer R enables most prime numbers having the desired size to be obtained in a single iteration.

List of the previously mentioned publications:

[1] C. Pomerance, C. Selfridge, and J. L. Wagstaff. "The pseudoprimes to 25×10e9", Mathematics of Computation, 35:1003-1026, 1990.

[2] G. Jaeschke, "On strong pseudoprimes to several bases", Mathematics of Computation, 61:915-926, 1993.

[3] U. M. Maurer, "Fast generation of prime numbers and secure public-key cryptographic parameters", J. Cryptology, 8(3):123-155, 1995.

[4] J. Shawe-Taylor, "Generating strong primes", Electronic Letters, 22(16):875-877, 1986.

[5] FIPS PUB 186-3, "Digital Signature Standard", National Institute of Standards and Technology, October 2009.

[6] J. Brillhart, D. H. Lehmer, J. L. Selfridge, B. Tuckerman, and Jr. S. S. Wagstaff, "Factorization of b"±1, b=2; 3; 5; 7; 10; 11; 12 Up to High Powers", vol. 22, American Mathematical Society, 1988.

[7] M. Joye, P. Paillier, S. Vaudenay, "Generation of Prime Numbers", CHES 2000, p. 340-354

The invention claimed is:

1. A cryptographic method implemented in an electronic device including a microcircuit that is integrated in a smart card or a chip card, the method comprising steps of:
   receiving, at the electronic device, data from a computer;
   (a) storing, in a memory of the electronic device, a group of small prime numbers greater than 2,
   (b) calculating, by the microcircuit, and storing, in the memory of the electronic device, a product of the prime numbers of the stored group,
   (c) generating, by the microcircuit, an invertible number belonging to a set of invertible elements modulo the stored product,
   (d) generating, by the microcircuit, a prime number,
   (e) generating, by the microcircuit, an integer,
   (f) generating, by the microcircuit, a candidate prime number having a desired number of bits, using a formula:

$Pr = 2P \cdot R + 1$,

Pr being the candidate prime number, P being the prime number and having a number of bits equal with a margin of one bit to half or one third of the number of bits of the candidate prime number, and R being the integer which is generated from the invertible number so that the candidate prime number is not divisible by any number of the stored group, the desired number of bits being greater than or equal to 512;
   (g) storing, in the microcircuit, the candidate prime number as a proven prime number in response to passing the Pocklington primality test, else generating a new candidate prime number and performing steps (d) to (g) again with the new candidate prime number; and
   (h) applying, by the microcircuit, a cryptographic operation to data using the stored proven prime number, wherein the cryptographic operation is an encryption operation or a decryption operation, or a verification of a digital signature contained in the data.

2. The method according to claim 1, wherein the integer R is chosen equal to:

$R = (X - (2P)^{-1} \mod \Pi v) + Z \cdot \Pi v$

R being the integer, X being an invertible number modulo the stored product, $\Pi v$ being the stored product, P being the prime number, and Z being an integer chosen so that the integer has a number of bits such that the candidate prime number has the desired number of bits.

3. The method according to claim 1, comprising steps of:
   generating a new candidate prime number from the invertible number multiplied by 2 modulo the stored product, if the candidate prime number does not pass the Pocklington primality test, and
   applying the Pocklington primality test to the new candidate prime number.

4. The method according to claim 1, wherein the invertible number is generated so as to be lower than the product stored using the following equation:

$X^{\lambda \Pi v} = 1 \mod \Pi v$

X being the invertible number generated, $\Pi v$ being the stored product, and $\lambda \Pi v$ being the Carmichael number of the set of invertible elements modulo the stored product.

5. The method according to claim 4, wherein the invertible number is generated by randomly choosing an invertible candidate number lower than the stored product, and by incrementing it by one until it verifies the equation $X^{\lambda \Pi v} = 1 \mod \Pi v$, in which X is the invertible candidate number, $\Pi v$ is the stored product, $\lambda \Pi v$ is the Carmichael number of the set of invertible elements modulo the stored product $\Pi v$.

6. The method according to claim 4, wherein an invertible candidate number X is randomly chosen at a value lower than the stored product and incremented by the quantity:

$B(1 - X^{\lambda \Pi v} \mod \Pi v)$, in which B is an integer randomly chosen between one and the stored product, X is the invertible candidate number, $\Pi v$ is the stored product, $\lambda \Pi v$ is the Carmichael number of the set of invertible elements modulo the stored product $\Pi v$, until it verifies the equation, the integer B being chosen randomly at a value lower than the stored product.

7. The method according to claim 1, wherein the number of bits of the prime number is equal with a margin of one bit to one third of the number of bits of the candidate prime number, the method comprising a step of calculating a quotient of an integer division of the integer by the prime number, a new candidate prime number being generated if the quotient is even, else performing step (g).

8. The method according to claim 1, wherein the integer is chosen in the interval [I+1, 2I] with $$I = \left\lfloor \frac{2^{L-1}}{2P} \right\rfloor$$

L being the desired number of bits of the candidate prime number, and P being the prime number.

9. The method according to claim 1, comprising several generation steps of generating a new prime number, the generation steps comprising a first generation step supplying a prime number from a first prime number, and subsequent generation steps each supplying a prime number from the prime number obtained in the previous generation step, until a prime number formed of the desired number of bits is obtained, each generation step comprising generating a candidate prime number and testing if the candidate prime number is a prime number.

10. The method according to claim 9, wherein one of the generation steps of generating a new prime number comprises:
   (i) calculating a candidate prime number having a number of bits, using the following formula:

$Pr=2P\cdot R+1$

Pr being the candidate prime number, P being a proven prime number having a number of bits equal with a margin of one bit to half or one third of the number of bits of the candidate prime number, and R being a randomly chosen integer,
   (j) testing the divisibility of the candidate prime number by the prime numbers of the stored group,
   (k) when the candidate prime number is not divisible by the prime numbers of the stored group, applying the Pocklington primality test to the candidate prime number Pr,
   (l) when one of the divisibility and Pocklington tests fails for the candidate prime number, incrementing the integer by one, incrementing the candidate prime number by twice the prime number, and executing the steps (j) to (l) again as long as the incremented candidate prime number fails the divisibility or Pocklington tests.

11. The method according to claim 10, wherein testing the divisibility of the candidate prime number by numbers of the stored group comprises steps of:
   storing as first remainders, the remainders of integer divisions of the candidate prime number by each of the numbers of the stored group, the candidate prime number being not a prime number if one of the first remainders is zero,
   storing as second remainders, the remainders of integer divisions of twice the prime number by each of the numbers of the stored group, and
   when a new candidate prime number is calculated from the candidate prime number by adding twice the prime number thereto, updating each of the first remainders by adding thereto the second remainder corresponding to the same prime number of the stored group modulo the same prime number of the stored group.

12. The method according to claim 11, wherein each of the second remainders is updated by receiving the double of the first remainder corresponding to the same prime number of the stored group modulo the same prime number of the stored group, when a new candidate prime number is generated from the prime number obtained in the previous generation step.

13. The method according to claim 12, wherein the first prime number is obtained by randomly choosing a number formed of a number of bits lower than a maximum number of bits, and by successively applying thereto a limited number of primality tests comprising several Miller-Rabin tests applied in different bases, until a number passing the Miller-Rabin tests is obtained, the maximum number of bits and the values of the bases being chosen to prove the primality of the first prime number.

14. The method according to claim 13, wherein the Miller-Rabin tests applied to the randomly chosen number, are performed in bases 2, 7 and 61 with a maximum number of bits chosen lower than or equal to 32, or in bases 2, 3, 5, 7, 11, 13 and 17, with a maximum number of bits chosen lower than or equal to 48.

15. The method according to claim 13, wherein the Miller-Rabin tests applied to the randomly chosen number are preceded by a divisibility test of the number randomly chosen by numbers of a list of the smallest prime numbers.

16. The method according to claim 1, comprising steps of generating an encryption key from proven prime numbers.

17. The method of claim 1, wherein the memory of the electronic device is included in the microcircuit.

18. An electronic device comprising:
   a microcircuit integrated in a smart card or a chip card, the electronic device being configured to perform the steps of:
   receiving, at the electronic device, data from a computer;
   (a) storing, in a memory of the electronic device, a group of small prime numbers greater than 2,
   (b) calculating, by the microcircuit, and storing, in the memory of the electronic device, a product of the prime numbers of the stored group,
   (c) generating, by the microcircuit, an invertible number belonging to a set of invertible elements modulo the stored product,
   (d) generating, by the microcircuit, a prime number,
   (e) generating, by the microcircuit, an integer,
   (f) generating, by the microcircuit, a candidate prime number having a desired number of bits, using a formula:

$Pr=2P\cdot R+1$,

Pr being the candidate prime number, P being the prime number and having a number of bits equal with a margin of one bit to half or one third of the number of bits of the candidate prime number, and R being the integer which is generated from the invertible number so that the candidate prime number is not divisible by any number of the stored group, the desired number of bits being greater than or equal to 512;
   (g) storing, in the microcircuit, the candidate prime number as a proven prime number in response to passing the Pocklington primality test, else generating a new candidate prime number and performing steps (d) to (g) again with the new candidate prime number; and
   (h) applying, by the microcircuit, a cryptographic operation to data using the stored proven prime number, wherein the cryptographic operation is an encryption operation or a decryption operation, or a verification of a digital signature contained in the data.

19. An integrated circuit on a semiconductor chip, comprising a device according to claim 18.

20. The device according to claim 18, wherein the integer is chosen equal to:

$$R=(X-(2P)^{-1} \bmod \Pi v)+Z\cdot\Pi v$$

R being the integer, X being an invertible number modulo the stored product, Πv being the stored product, P being the prime number, and Z being an integer chosen so that the integer has a size such that the candidate prime number has the desired number of bits.

21. The device according to claim 18, further configured to:
generate a new candidate prime number from the invertible number multiplied by 2 modulo the stored product, if the candidate prime number does not pass the Pocklington primality test, and
apply the Pocklington primality test to the new candidate prime number.

22. The device according to claim 18, wherein the invertible number is generated so as to be lower than the product stored using the following equation:

$$X^{\lambda.\Pi v}=1 \bmod \Pi v$$

X being the invertible number generated, Πv being the stored product, and λΠv being the Carmichael number of the set of invertible elements modulo the stored product.

23. The device according to claim 22, further configured to generate the invertible number by randomly choosing an invertible candidate number lower than the stored product, and by incrementing it by one until it verifies the equation $X^{\lambda.\Pi v}=1 \bmod \Pi v$, in which X is the invertible candidate number, Πv is the stored product, λΠv is the Carmichael number of the set of invertible elements modulo the stored product Πv.

24. The device according to claim 22, further configured to randomly choose an invertible candidate number X at a value lower than the stored product and incremented by the quantity:

$$B\cdot(1-X^{\lambda.\Pi v} \bmod \Pi v),$$

in which B is an integer randomly chosen between one and the stored product, X is the invertible candidate number, Πl is the stored product, λΠv is the Carmichael number of the set of invertible elements modulo the stored product Πv, until it verifies the equation, the integer B being chosen randomly at a value lower than the stored product.

25. The device according to claim 18, wherein the number of bits of the prime number is equal with a margin of one bit to one third of the number or bits of the candidate prime number, the device being further configured to calculate a quotient of an integer division of the integer by the prime number, and to generate a new candidate prime number if the quotient is even, and else to perform step (g).

26. The device according to claim 18, wherein the integer is chosen in the interval [I+1, 2I] with:

$$I = \left\lfloor \frac{2^{L-1}}{2P} \right\rfloor$$

L being the desired number of bits of the candidate prime number, and P being the prime number.

27. The device according to claim 18, further configured to perform several generation steps of generating a new prime number, the generation steps comprising a first generation step supplying a prime number from a first prime number, and subsequent generation steps each supplying a prime number from the prime number obtained in the previous generation step, until a prime number formed of the desired number of bits is obtained, each generation step comprising generating a candidate prime number and testing if the candidate prime number is a prime number.

28. The device according to claim 27, wherein one of the generation steps of generating a new prime number comprise steps of:
(i) calculating a candidate prime number having a number of bits, using the following formula:

$$Pr=2P\cdot R+1$$

Pr being the candidate prime number, P being a proven prime number having a number of bits equal with a margin of one bit to half or one third of the number of bits of the candidate prime number, and R being a randomly chosen integer,
(j) testing the divisibility of the candidate prime number by the prime numbers of the stored group,
(k) when the candidate prime number is not divisible by the prime numbers of the stored group, applying the Pocklington primality test to the candidate prime number Pr,
(l) when one of the divisibility and Pocklington tests fails for the candidate prime number, incrementing the integer by one, incrementing the candidate prime number by twice the prime number, and executing the steps (j) to (l) again as long as the incremented candidate prime number fails the divisibility or Pocklington tests.

29. The device according to claim 28, wherein, for testing the divisibility of the candidate prime number by numbers of the stored group, the device is further configured to:
store as first remainders, the remainders of integer divisions of the candidate prime number by each of the numbers of the stored group, the candidate prime number being not a prime number when one of the first remainders is zero,
store as second remainders, the remainders of integer divisions of twice the prime number by each of the numbers of the stored group, and
when a new candidate prime number is calculated from the candidate prime number by adding twice the prime number thereto, updating each of the first remainders by adding thereto the second remainder corresponding to the same prime number of the stored group modulo the same prime number of the stored group.

30. The device according to claim 29, further configured to update each of the second remainders by receiving the double of the first remainder corresponding to the same prime number of the stored group modulo the same prime number of the stored group, when a new candidate prime number is generated from the prime number obtained in the previous generation step.

31. The device according to claim 30, further configured to obtain the first prime number by randomly choosing a number formed of a number of bits lower than a maximum number of bits, and by successively applying thereto a limited number of primality tests comprising several Miller-Rabin tests applied in different bases, until a number passing the Miller-Rabin tests is obtained, the maximum number of bits and the values of the bases being chosen to prove the primality of the first prime number.

32. The device according to claim 31, further configured to apply the Miller-Rabin tests to the randomly chosen number, in bases 2, 7 and 61 with a maximum number of bits chosen lower than or equal to 32, or in bases 2, 3, 5, 7, 11, 13 and 17, with a maximum number of bits chosen lower than or equal to 48.

33. The device according to claim 31, further configured to apply the Miller-Rabin tests to the randomly chosen number after applying a divisibility test to the randomly chosen number by numbers of a list of the smallest prime numbers.

34. The device according to claim 18, further configured to generate an encryption key from proven prime numbers.

35. The device of claim 18, wherein the memory of the electronic device is included in the microcircuit.

* * * * *

UNITED STATES PATENT AND TRADEMARK OFFICE
CERTIFICATE OF CORRECTION

PATENT NO. : 9,596,080 B2  
APPLICATION NO. : 14/365899  
DATED : March 14, 2017  
INVENTOR(S) : Feix et al.

Page 1 of 1

It is certified that error appears in the above-identified patent and that said Letters Patent is hereby corrected as shown below:

On the Title Page

Column 1, Item (72), under "Inventors", Line 2, delete "Rilhac Lastours" and insert -- Rilhac-Lastours --, therefor.

In the Claims

In Column 20, Line 4, Claim 1, delete "in an the" and insert -- in the --, therefor.

In Column 22, Line 21, Claim 17, delete "The method of claim" and insert -- The method according to claim --, therefor.

In Column 23, Line 43, Claim 24, delete "ΠΙ" and insert -- ΠV --, therefor.

In Column 23, Line 50, Claim 25, delete "or bits" and insert -- of bits --, therefor.

In Column 25, Line 11, Claim 35, delete "The device of claim" and insert -- The device according to claim --, therefor.

Signed and Sealed this  
Thirtieth Day of May, 2017

Michelle K. Lee  
*Director of the United States Patent and Trademark Office*